United States Patent [19]
Voegele et al.

[11] Patent Number: 5,535,243
[45] Date of Patent: Jul. 9, 1996

[54] POWER SUPPLY FOR FIELD MOUNTED TRANSMITTER

[75] Inventors: Kevin D. Voegele, Shakopee; Todd A. Piechowski, Buffalo, both of Minn.

[73] Assignee: Rosemount Inc., Eden Prairie, Minn.

[21] Appl. No.: 274,385

[22] Filed: Jul. 13, 1994

[51] Int. Cl.$^6$ ............... H04L 27/04; H04L 27/12; H04L 27/20
[52] U.S. Cl. ............ 375/259; 455/343; 340/870.16; 364/550
[58] Field of Search ............... 375/59; 364/550, 364/138; 455/343; 340/870.16

[56] References Cited

U.S. PATENT DOCUMENTS

| | | | |
|---|---|---|---|
| 4,206,397 | 6/1980 | Dahlke | 323/22 T |
| 4,502,318 | 3/1985 | Converse, III et al. | 73/3 |
| 4,621,551 | 11/1986 | Silverman | 82/31 |
| 4,755,773 | 7/1988 | Ohmagari | 332/9 R |
| 4,804,958 | 2/1989 | Longsdorf | 340/860 |
| 4,833,922 | 5/1989 | Frick et al. | 73/756 |
| 4,866,435 | 9/1989 | Frick | 340/870.16 |
| 4,889,179 | 12/1989 | Merenda | 165/14 |
| 5,089,974 | 2/1992 | Demeyer et al. | 364/492 |
| 5,146,401 | 9/1992 | Bansal et al. | 364/138 |
| 5,179,488 | 1/1993 | Rovner | 361/18 |
| 5,187,474 | 2/1993 | Kielb et al. | 340/870 |
| 5,245,333 | 9/1993 | Anderson et al. | 340/870 |
| 5,258,868 | 11/1993 | Jensen et al. | 359/168 |
| 5,333,114 | 7/1994 | Warrior et al. | 364/550 |

FOREIGN PATENT DOCUMENTS

WO94/01764  1/1994  European Pat. Off.
4021258A1  1/1991  Germany.
2229897A  3/1990  United Kingdom.

OTHER PUBLICATIONS

Brochure: "Preliminary LTC1149, LTC1149-3.3, LTC 1149-5; High Efficiency Synchronous Stepdown Switching Regulator," Linear Technology Corporation, Milpitas, California, pp. 1–16, Nov. 1992.

Brochure: "LM494 Pulse Width Modulated Control Circuit," National Semiconductor Corporation, Santa Clara, California, pp. 17–23 (undated).

Brochure: "Maxim High–Efficiency, +5V Adustable Step--down Switching Regulator," Maxim Integrated Products, Sunnyvale, California, pp. 1–8, Copyrighted 1991.

Schematic: Power supply circuited used in a process control transmitter which is believed to have been on sale more than one year prior to the filing of the present application.

Schematic: Power supply circuited used in a process control transmitter which is believed to have been on sale more than one year prior to the filing of the present application.

*Primary Examiner*—Stephen Chin
*Assistant Examiner*—Bryan Webster
*Attorney, Agent, or Firm*—Westman, Champlin & Kelly

[57] ABSTRACT

A field mounted transmitter for use in a two-wire process control loop includes a sensor, measurement circuitry and a power supply. The sensor senses a process variable of a process which is transmitted over the control loop by the measurement circuitry. The power supply is powered by a current flowing through the control loop and powers the measurement circuitry. The power supply includes an inductive element coupled to the measurement circuitry and a switch which selectively couples the inductive element to the control loop.

9 Claims, 4 Drawing Sheets

5,535,243

POWER SUPPLY FOR FIELD MOUNTED TRANSMITTER

BACKGROUND OF THE INVENTION

The invention relates to a field mounted measurement transmitter powered by a process control loop which transmits a process variable over the control loop. More specifically, the invention relates to a power supply for the field mounted transmitter.

Process control systems are used in industry to monitor and control process. A field mounted transmitter monitors a variable of the process, such as temperature, flow rate, or pressure. The transmitter is coupled to a two-wire process control loop which carries a loop current, I. Loop current I powers the transmitter. The transmitter sends the process variable over the control loop to a central controller which monitors the entire process. The central controller uses the process variable received from the transmitter to control the process.

The power which is available for use by the transmitter is limited by the control loop. Typical control loops include a 4–20 mA standard in which a 4 mA signal represents a zero and a 20 mA signal represents a full scale reading. The transmitter transmits the process variable by controlling current I. Digital information may also be transmitter on the same loop. Another standard is the field bus standard in which multiple transmitters can couple to the same control loop.

It is desirable to provide the field mounted transmitters with a high level of computational ability. The advantages of such ability are numerous and include error correction, data logging, and diagnostic functions. However, power limitations put a constraint on the processing capabilities of the transmitter. For example, if a microprocessor is performing the calculations its clock speed must be slowed appropriately to limit power draw.

Therefore, power constraints are a limiting factor in the capabilities of field mounted transmitters.

SUMMARY OF THE INVENTION

The present invention provides an efficient power supply for a field mounted transmitter in a two-wire process control loop in which the transmitter is powered by the control loop. The transmitter includes a sensor for sensing a process variable of a process and measurement circuitry for transmitting the process variable over the control loop. A power supply circuit receives the loop current from the control loop and powers the measurement circuitry. The power supply circuit includes an inductive element coupled to the measurement circuitry which powers the measurement circuitry. A switch is controlled to selectively couple the energy inductive to the control loop. When the switch couples the inductive element to the control loop, the inductive element receives energy from the loop current flowing through the control loop.

DETAILED DESCRIPTION OF THE PREFERRED EMBODIMENTS

Figure 1:
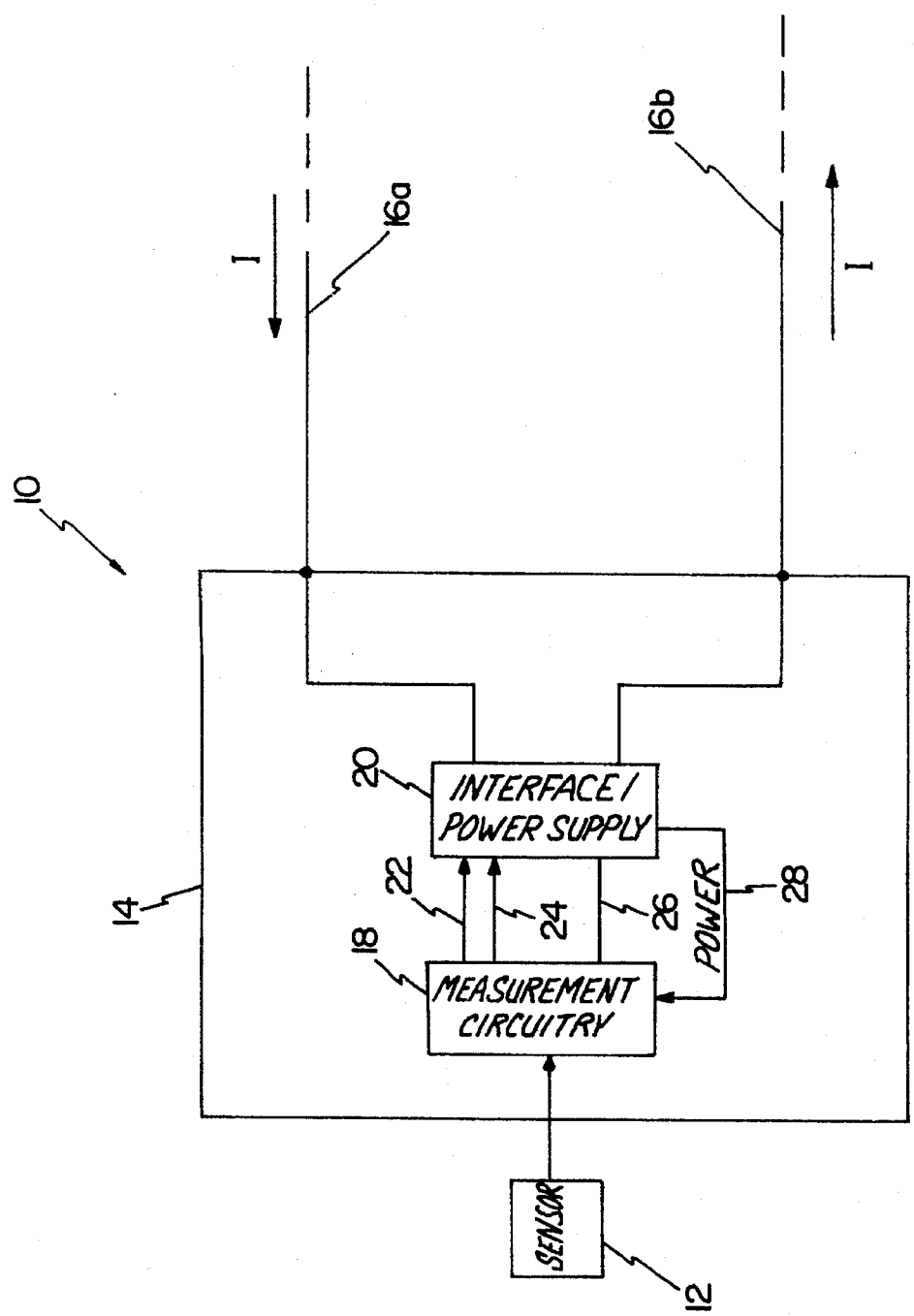
FIG. 1 is a simplified diagram of a transmitter including power supply circuitry in accordance with invention.

FIG. 1 is a block diagram of transmitter 10 which includes sensor 12 and transmitter electronics 14 coupled to control loop 16a and 16b. Transmitter electronics 14 includes measurement circuitry 18 and interface/power supply circuitry 20 in accordance with the invention. In operation, transmitter 10 is in communication with a controller (not shown) coupled to current loop 16a/16b. Transmitter 10 senses a process variable such as temperature, pressure, or flow and transmits the information to the controller. This transmission can be, for example, by controlling the flow of current I through loop 16a/16b between a 4 mA signal which represents a minimum value and a 20 mA signal which represents a full scale value of the process variable. Measurement circuitry 18 receives the process variable from sensor 12 and controls circuitry 20 to modulate loop current I. Additionally, in some communication protocols such as the HART® standard, measurement circuitry 18 is in digital communication over loop 16a/16b and digitally transmits the sensed process variables. Measurement circuitry 18 sends digital information to and receives digital commands from the controller (not shown) over loop 16a/16b. Circuitry 20 also uses loop current I to power transmitter 10.

FIG. 1 also shows the various inputs and outputs between circuitry 18 and power supply 20. Digital information is provided to interface/power supply 20 over data line 24. An analog output for measurement circuitry 18 is provided to interface/power supply 20 through line 22. Information received from loop 16a/16b is provided to measurement circuitry 18 through data line 26. Additionally, electrical power is supplied to measurement circuitry 18 by circuitry 20 over power line 28 in accordance with the invention.

Figure 2:
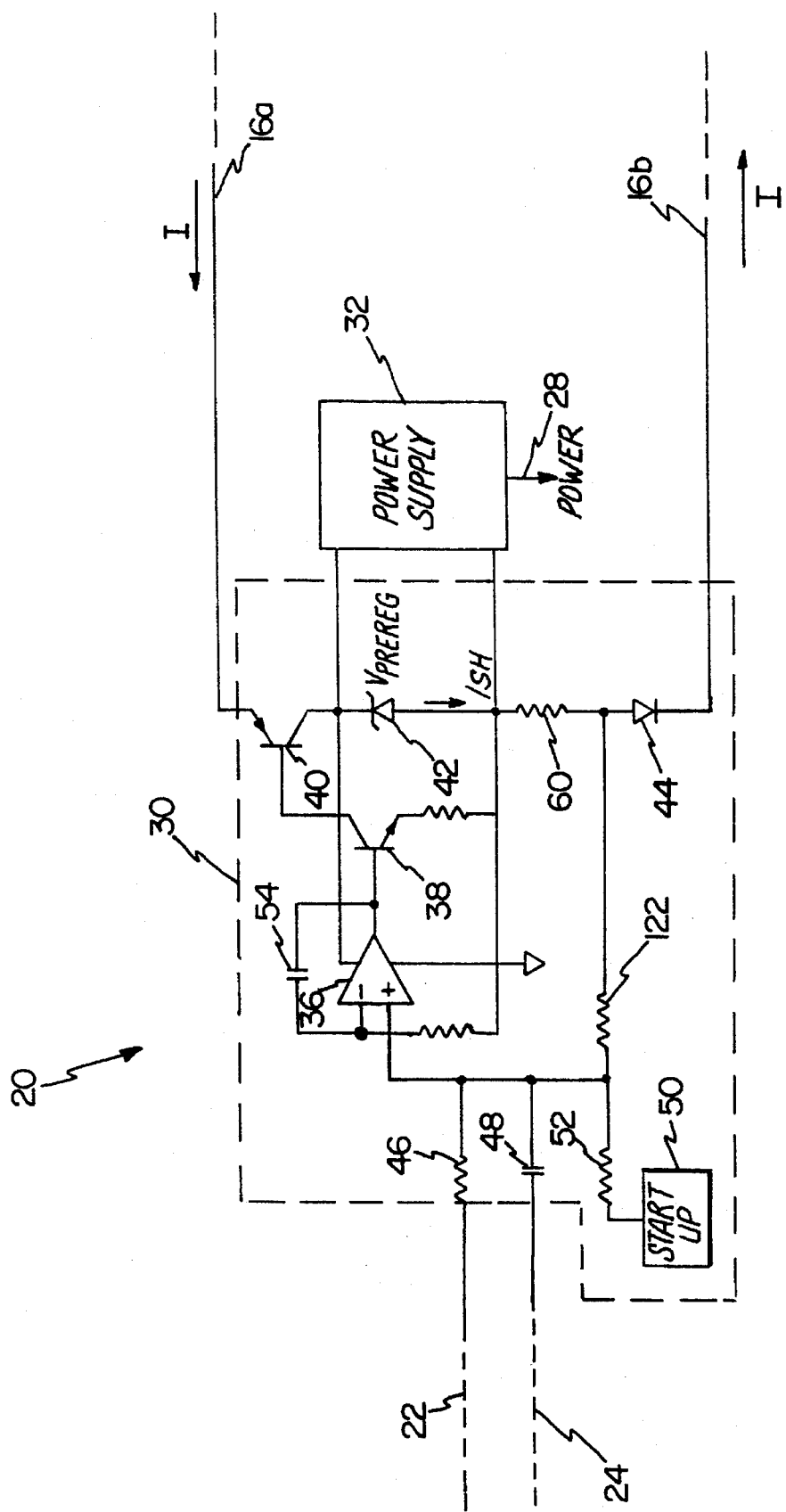
FIG. 2 is a simplified schematic diagram which shows the interface circuitry of FIG. 1.

FIG. 2 shows a more detailed view of a portion of interface/power supply 20 of FIG. 1. Circuitry 20 includes interface circuitry 30 and power supply 32 coupled to loop 16a/16b. For simplicity, circuitry that senses digital signals in loop 16a/16b and conveys such signals to measurement circuitry 18 through line 26, known to those of ordinary skill in the art, is not shown.

Interface circuitry 30 includes op amp 36, transistors 38 and 40, zener diode 42, and diode 44. Analog and digital inputs 22 and 24 are coupled to op amp 36 through resistor 46 and capacitor 48, respectively. A startup circuit 50 couples to op amp 36 through resistor 52. Op amp 36 couples to the base of transistor 38 whose collector connects to the base of transistor 40. Zener diode 42 provides a current shunt and a relatively constant voltage drop which is used to power op amp 36 and as a preregulated input to power supply 32. Sense resistor 60 provides a voltage proportion to the loop current to feedback resistor 122 which then is the loop current feedback to op amp 36 related to loop current I through loop 16a/16b.

In operation, digital information is sent by circuitry 30 onto loop 16a/16b by rapid modulation of current I using transistor 40, which responds to modulation signals on data line 24 via node 34. The slowly varying portion of current I (referred to herein as analog current) through loop 16a/16b is controlled through input 22, which in turn controls transistor 40 via op amp 36. The startup circuitry 50 is used to provide a transitory step input to op amp 36 in order to develop a large enough voltage drop across diode 42 to power op amp 36 and turn on power supply 32. Once the circuitry is active, the step input to op amp 36 from startup circuitry 50 is removed. Once power from output 28 has been supplied to a microprocessor in measurement circuitry 18, the microprocessor sets the signal carried on line 22 such that the loop current I reaches its desired analog level. Diode 44 provides reverse protection in the event that an operator attempts to force current through loop 16a/16b in the wrong direction.

In order to increase the available power, the voltage drop across diode 42 should be selected to be as high as possible. As explained below, power supply 32 converts the input power (voltage times current) to output power at about 90% efficiency. In a 4–20 mA system, the minimum current into supply 32 can be as low as 3.5 mA. Therefore, a large voltage drop across diode 42 helps increase available power. On the other hand, the maximum value of the voltage drop across diode 42 should be selected based upon the minimum voltage at which the transmitter 10 is required to operate. This is based upon the following equation:

$$V_{MIN} = V_{CE\ of\ 40} + V_{42} + (I \times R_{60}) + V_{44} \quad \text{Equation 1}$$

where the $V_{MIN}$ is the minimum voltage at which the transmitter must operate, $V_{CE\ of\ 40}$ is the forward voltage drop across the collector and emitter of transistor 40, $V_{42}$ is the voltage drop across diode 42, I is the loop current, $R_{60}$ is the resistance of resistor 60, and $V_{44}$ is the voltage drop across diode 44.

Figure 3:
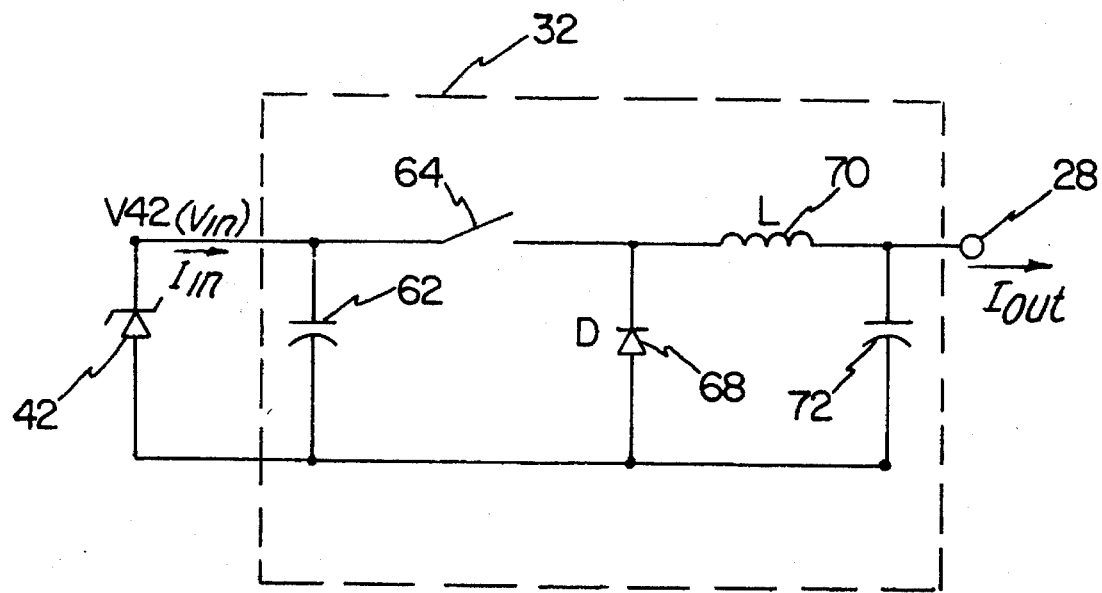
FIG. 3 is a simplified schematic diagram of a power supply in accordance with the present invention.

FIG. 3 is a simplified schematic diagram of power supply 32. Supply 32 includes capacitor 62, switch 64, diode 68, inductor 70, and capacitor 72 connected as shown in FIG. 3. In operation, input capacitor 62 receives an input current from control loop 16a/16b causing it to charge and thereby provides a voltage source to switch 64. When switch 64 is closed, the voltage across capacitor 62 is applied to inductor 70. The current through inductor 70 ramps up, storing energy in the magnetic field of inductor 70. This current also flows into the output filter capacitor 72 and out through power lead 28. When switch 64 is opened, the current continues to flow through inductor 70 in the same direction. However, when switch 64 is open the current flows through diode 68. With switch 64 in the open position, only current from inductor 70 is supplied to the load through connection 28. This current tends to decay toward zero as the energy stored in the magnetic field of inductor 70 is transferred to capacitor 72 and the load. The duty cycle of switch 64 is controlled by circuitry (not shown in FIG. 3) such that the current drawn by the load coupled to line 28 is substantially constant (DC). Feedback is used by the circuitry to monitor the output voltage to control switch 64.

It is helpful at this point to define efficiency:

$$\text{efficiency} = \frac{P_{OUT}}{P_{IN}} \quad \text{Equation 2}$$

or:

$$\text{efficiency} = \frac{V_{OUT} \times I_{OUT}}{V_{IN} \times I_{IN}} \quad \text{Equation 3}$$

Figure 4:
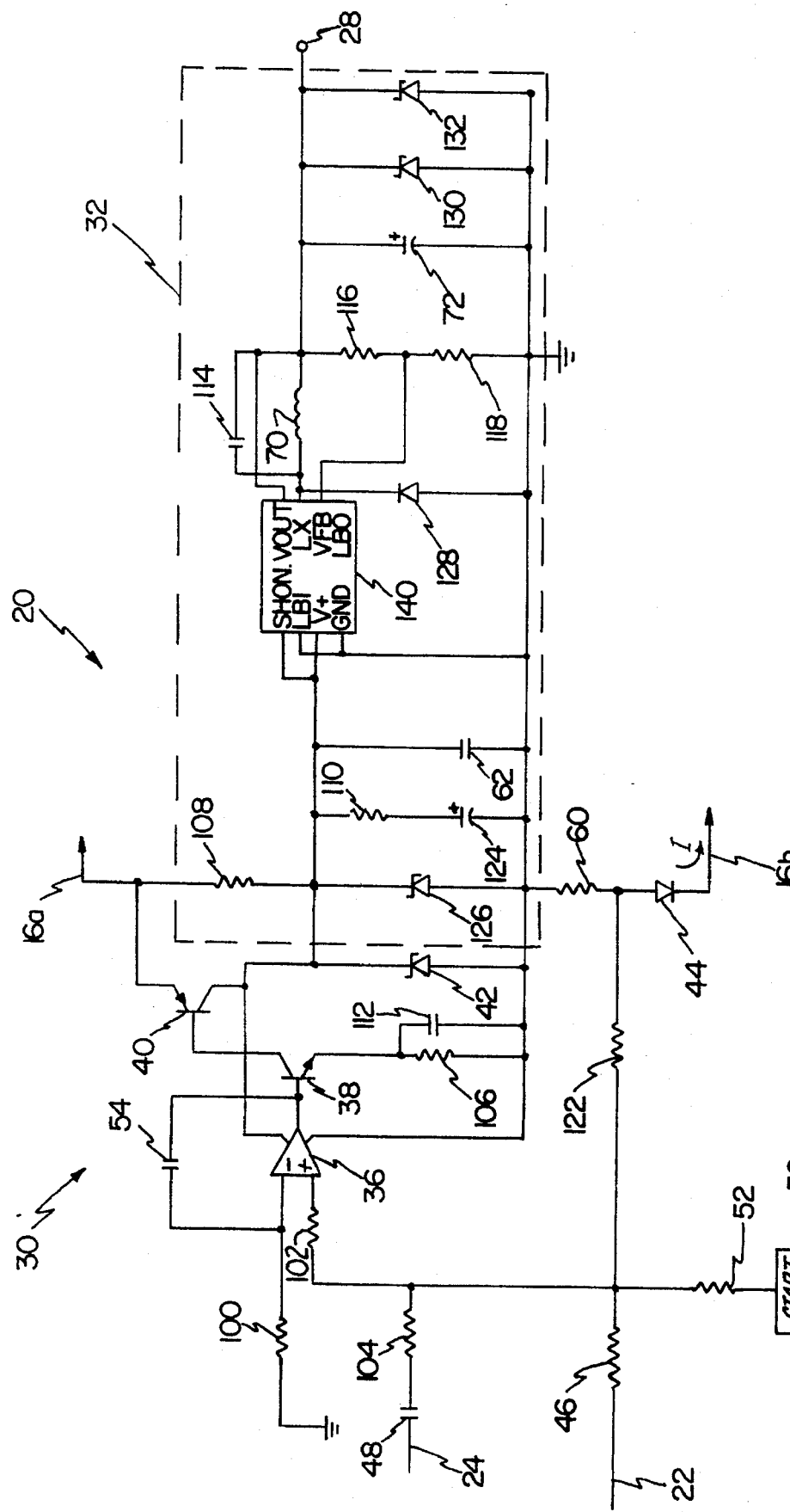
FIG. 4 is a schematic diagram showing interface and power supply circuitry of the invention.

FIG. 4 shows a detailed schematic diagram of interface/power supply circuitry 20 in accordance with the present invention. To the extent possible, numbering has remained the same between FIG. 4 and FIGS. 2 and 3. Circuitry 18 and line 26 are known in the art and not shown in FIG. 4. The component value of circuit elements of FIG. 4 are as follows:

| RESISTORS | |
|---|---|
| 46 | 46K Ω |
| 60 | 50K Ω |
| 100 | 12K Ω |
| 102 | 12K Ω |
| 104 | 12K Ω |
| 106 | 10K Ω |
| 108 | 22K Ω |
| 110 | 6.2K Ω |
| 116 | 1K MΩ |
| 118 | 578K Ω |
| 122 | 40.2K Ω |
| CAPACITORS | |
| 48 | 2700 PF |
| 54 | 6800 PF |
| 62 | 0.1 μF |
| 72 | 150 μF |
| 124 | 150 μF |
| DIODES | |
| 42 | 7.5 V zener |
| 44 | pn |
| 112 | 800 pF |
| 114 | 20 pF |
| 126 | 7.5 V zener |
| 128 | pn 1N 5817 |
| 130 | 4.7 V zener |
| 132 | 4.7 V zener |
| INDUCTOR | |
| 70 | 1000 μH |

FIG. 4 also shows integrated circuit 140 which is MAX 639ESA regulator available from Maxim Integrated Products, 120 San Gabriel Drive, Sunnyvale, Calif. 94086.

The circuitry of FIG. 4 operates similar to the simplified circuits shown in FIGS. 2 and 3. Integrated circuit 140 includes switch 64 and circuitry to control the opening and closing of switch 64. The various inputs and outputs of integrated circuit 140 are as follows:

TABLE 1

| NAME | FUNCTION |
|---|---|
| $V_{OUT}$ | Sense pin for fixed +5 V output operation. |
| LBO | Low-Battery Output. |
| LBI | Low-Battery Input. When the voltage on LBI drops below +1.28, LBO draws current. |
| GND | Electrical Ground. |
| LX | LX drives the external inductor which provides current to the load. |
| V+ | Positive Voltage Input. |
| VFB | Feedback Pin. |
| SHDN | Shutdown input -- active low. When pulled below 0.8 V, the LX power switch stays off, shutting down the regulator. |

As discussed above, startup circuit 50 causes the input to op amp to initially go high when transmitter 10 is turned on. This causes a large amount of current to be drawn from loop 16a/16b which charges capacitors in power supply 32. Circuit 50 maintains the high state for approximately 200 mS at which point power supply 32 provides a regulated output on power line 28 and transmitter 10 can begin functioning.

Figure 5:
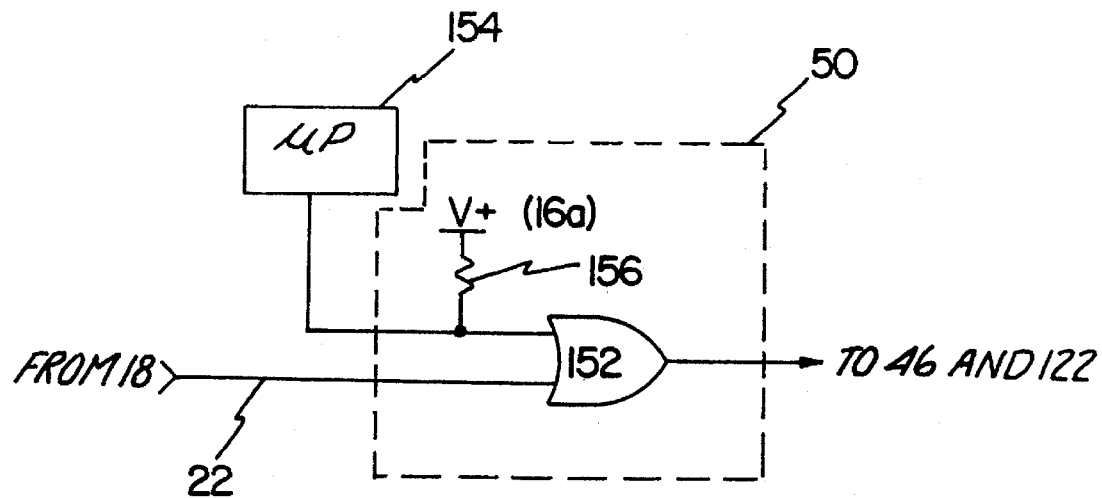
FIG. 5 is a simplified schematic diagram of startup circuitry for the invention.

FIG. 5 is a diagram of startup circuit 50 used to provide a startup input to op amp 36. OR gate 152 receives a first input on data line 22 from circuitry 18. A second input to OR gate 152 connects to a microprocessor 154 of transmitter 10 which is contained in measurement circuitry 18. A pull-up resister 156 is also connected between this second input to OR gate 152 and a positive voltage level V+ of wire 16a. When transmitter 10 first receives power through loop 16a/16b, the input to OR gate 152 is pulled up through pull-up resister 156 connected to the positive voltage level V+ of wire 16a. This positive voltage input causes the output of OR gate 152 to go high which is connected to sum node 36 through resisters 46 and 102 thereby allowing power supply 32 to receive a large current to initiate operation. Once power supply 32 is operating, a regulated output is provided on power line 28 which is used to energize measurement circuitry 18, including microprocessor 154. Microprocessor 154 then provides a low output forcing the second input of OR gate 152 to a low state thereby allowing the signal from circuitry 18 on data line 22 to directly control the output from OR gate 152 provided to op amp 36. Thus, once microprocessor 154 is operating, data on line 22 is modulated onto loop 16a/16b through op amp 36 as described above.

The present invention provides a power supply for use in a two-wire process control transmitter. The power supply can be configured for high efficiency. In typical process control systems loop current can be less than 4 mA. The power supply of the present invention is capable of providing current to measurement circuitry in the transmitter which is greater than the loop current I flowing in the control loop. Further, the high efficiency of the power supply results in greater power to measurement circuitry than prior art designs which allows more components and/or higher clock speeds in the measurement circuitry.

Although the present invention has been described with reference to preferred embodiments, workers skilled in the art will recognize that changes may be made in form and detail without departing from the spirit and scope of the invention. For example, the invention can be used in other types of devices which couple to two-wire process control loops such as field controllers or configuration devices.

What is claimed is:

1. A transmitter for use in a two-wire process control loop, comprising:

a sensor which senses a process variable and provides an output signal representative of the process variable;

measurement circuitry coupled to the sensor to receive the output signal, the measurement circuitry transmitting a signal over the two-wire process control loop indicative of a value of the process variable;

power supply circuitry coupled to the measurement circuitry, the power supply circuitry receiving a loop current from the two-wire process control loop and providing an energizing current to the measurement circuitry, the power supply circuitry comprising:

an inductive element coupled to the measurement circuitry; and a switch selectively electrically connecting the inductive element to the two-wire process control loop to receive current from the two-wire process control loop;

a capacitor for storing charge;

modulation circuitry coupled to the measurement circuitry and the two-wire process control loop which responsively controls current through the two-wire process control loop; and startup circuitry coupled to the modulation circuitry which controls the modulation circuitry to cause an increase in control loop current during a startup condition whereby the capacitor in the power supply circuit is charged.

2. The transmitter of claim 1, wherein the energizing current is greater than the loop current.

3. The transmitter of claim 1 including analog transmission circuitry coupled to the modulation circuitry for transmitting analog information over the two-wire process control loop by controlling the loop current.

4. The transmitter of claim 1 including digital transmission circuitry coupled to the modulation circuitry for transmitting digital information over the two-wire process control loop by controlling the loop current.

5. The transmitter of claim 1 including a preregulator diode connected in parallel with the power supply and providing a substantially fixed voltage input to the power supply.

6. The transmitter of claim 1 wherein a voltage output from the power supply is greater than a voltage drop across the transmitter.

7. The transmitter of claim 1 wherein the startup circuitry remains in an on condition for about 200 msec. following the startup condition.

8. The transmitter of claim 1 wherein the startup circuitry is further coupled to the two-wire process control loop to receive an input signal indicating when a control loop current initially begins flowing therethrough.

9. The transmitter of claim 8 wherein the startup circuitry is further coupled to the measurement circuitry to receive an input therefrom indicating end of the startup condition.

* * * * *

UNITED STATES PATENT AND TRADEMARK OFFICE
CERTIFICATE OF CORRECTION

PATENT NO. : 5,535,243
DATED : July 9, 1996
INVENTOR(S) : Voegele et al.

It is certified that error appears in the above-indentified patent and that said Letters Patent is hereby corrected as shown below:

Column 6, line 18, replace "circuit" with --circuitry--.

Column 6, line 31, insert --circuitry-- after "supply".

Column 6, line 33, insert --circuitry-- after "supply".

Column 6, line 35, insert --circuitry-- after "supply".

Signed and Sealed this

Eighteenth Day of February, 1997

Attest:

BRUCE LEHMAN

*Attesting Officer*   *Commissioner of Patents and Trademarks*